(No Model.)

H. P. McMASTER.
VINEGAR GENERATOR.

No. 323,056. Patented July 28, 1885.

Witnesses.
M. A. Barnes.
R. W. Bishop.

Inventor.
Horace P. McMaster
By R. S. & A. P. Lacey
Att'ys.

UNITED STATES PATENT OFFICE.

HORACE P. McMASTER, OF LEONARDSBURG, OHIO.

VINEGAR-GENERATOR.

SPECIFICATION forming part of Letters Patent No. 323,056, dated July 28, 1885.

Application filed May 7, 1885. (No model.)

*To all whom it may concern:*

Be it known that I, HORACE P. MCMASTER, a citizen of the United States, residing at Leonardsburg, in the county of Delaware and State of Ohio, have invented certain new and useful Improvements in Vinegar-Generators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to the manufacture of vinegar; and it consists in a construction hereinafter fully explained, and pointed out in the claims.

Figure 1:
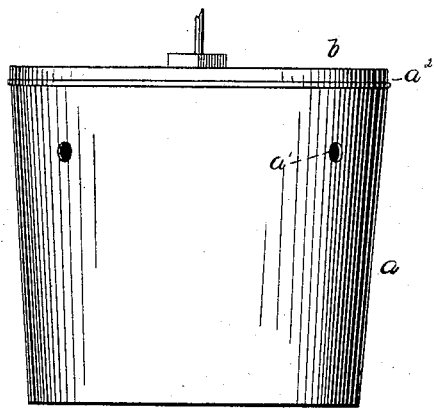
Figure 2:
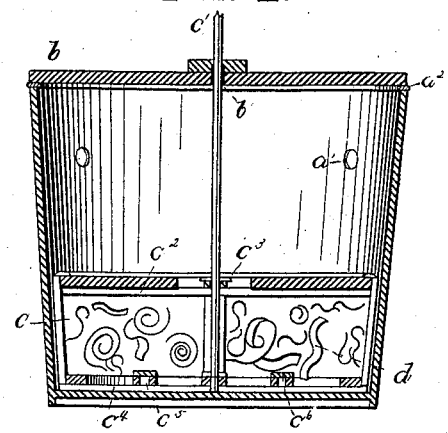
Figure 3:
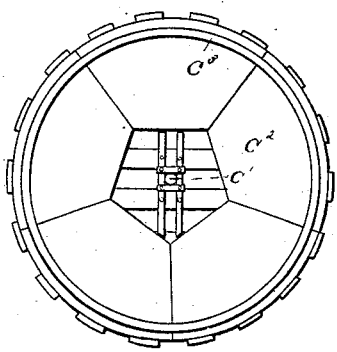
Figure 4:
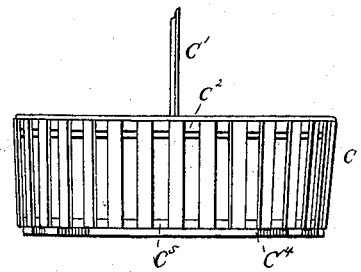
Figure 5:
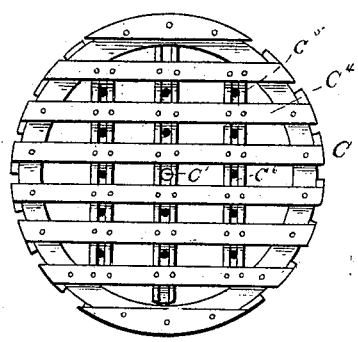
Figure 6:
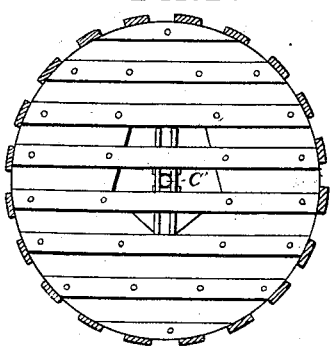

In the drawings, Figure 1 is a side elevation of the outer or main vessel having the lid in place thereon. Fig. 2 is a vertical longitudinal section of the main vessel and the plunger therein. Fig. 3 is a view of the top of the plunger. Fig. 4 is a side view of the same. Fig. 5 is a view of the bottom or under side of the same, and Fig. 6 shows the under side of the top of the same.

In carrying out my invention I do not limit myself to any particular form or vessel nor of plunger. These may be round, as shown in the drawings, or they may be rectangular, octagonal, or of any other outline, according to the pleasure of the mechanic who constructs them.

The vessel $a$ is provided with a series of openings, $a'$, near its upper edge to admit air into the interior thereof. When the vessel is filled to within a short distance of these springs with fluid to be acetified, and the plunger is at its highest point, the holes remain open; but when the plunger is depressed, owing to the rise of the fluid, these openings must be plugged, which may be done by ordinary stoppers.

The top of the vessel is provided with a packing-ring, $a^2$, on which the cover $b$ rests, the latter being centrally apertured at $b'$ to permit the passage of the plunger rod $c'$.

The plunger $c$ conforms to the shape of the outer vessel, and is moved up and down therein by any suitable means. Its bottom and sides are constructed of open slat-work, so that the fluid and air may pass readily through it. Its top is made of a continuous plate, preferably having an opening at its center surrounding the plunger-rod for the purpose, to force all the ascending air through the acetifying material. Near the top of the top plate, $c^2$, I place a packing, $c^3$, which extends entirely around the said top, as shown. When the plunger is drawn up till its top $c^2$ comes against the under side of the lid of the vessel, a close air-tight joint is made.

On the inner sides of the cross-slats $c^4$, which compose the bottom of the plunger, I place a series of inverted troughs, $c^5$, closed at their ends and provided with a series of small air-vents, $c^6$, which permit the air in the trough to pass upward through the body of the fluid.

$d$ represents shavings or other acetifying material placed within and filling the plunger.

The sole purpose of the hereinbefore-described construction is to thoroughly aerify the fluid, thereby causing the acetifying of the same in a short space of time. The shavings and inverted troughs carry a large amount of air to the bottom of the fluid, which air, escaping slowly through the same, performs the desired result.

The plunger is ordinarily kept at the top of the vessel with its packing pressed closely against the under side of the lid. Then at proper intervals of time the plunger is thrust to the bottom, carrying its contained air with it. A portion of the air escapes upward through the central opening in the top of the plunger, and other portions escape through the slat-work of the sides. The air held by the shavings escapes slowly. The air contained in the troughs passes upward much more slowly, so that there is a bubbling continued for quite a while after the plunger has been thrust down. After the plunger has been left for a little while at the bottom of the vessel it is raised to the top, and after the lapse of from two to four hours it is again thrust to the bottom. This process is repeated until the fluid is thoroughly acetified.

I am aware that churn-dashers have been provided with semi-cylindrical foraminous plates or beaters, also that the same have been provided with two foraminous plates at a distance apart, between which are journaled radially to the dasher-shaft rotary beaters. As such construction is foreign to my invention, no claim is made thereto.

Having thus described my invention, what I desire to claim, and obtain by Letters Patent, is—

1. In a vinegar-generator, the combination of a vessel for holding the fluid to be acetified and provided with lateral air openings, of an open slat or lattice work plunger working from top to bottom of the vessel and adapted to hold or retain the air and compel it to escape slowly upward through the fluid, substantially as set forth.

2. In a vinegar-generator, a plunger made of open slat or lattice work and partially closed on its upper side, and having one or more air-retaining inverted troughs having perforations through the bottom, substantially as and for the purposes set forth.

In testimony whereof I affix my signature in presence of two witnesses.

HORACE P. McMASTER.

Witnesses:
JAMES E. WHITE,
JOHN D. VAN DEMAN.